9/20/83 XR 4,405,856

United States Patent [19]

Poisson

[11] 4,405,856

[45] Sep. 20, 1983

[54] APPARATUS FOR RECORDING IDENTIFYING DATA CONCERNING THE USE OF A CREDIT CARD, CHEQUE OR THE LIKE

[76] Inventor: Paul Poisson, Box 121, Rouyn, Quebec, Canada, J9X 5C1

[21] Appl. No.: 439,297

[22] Filed: Nov. 4, 1982

Related U.S. Application Data

[63] Continuation-in-part of Ser. No. 328,709, Dec. 8, 1981, abandoned.

[30] Foreign Application Priority Data

Feb. 23, 1982 [CA] Canada ........ 396858

[51] Int. Cl.³ ........ G06F 7/08

[52] U.S. Cl. ........ 235/381; 235/380

[58] Field of Search ........ 235/380, 381; 346/107 C; 354/76; 340/825.35

[56] References Cited

U.S. PATENT DOCUMENTS

| | | | |
|---|---|---|---|
| 2,927,515 | 3/1960 | Simjian | 95/1.1 |
| 3,836,980 | 9/1974 | Groswiller | 346/22 |
| 4,038,523 | 7/1977 | Widmer et al. | 235/61.9 |
| 4,085,687 | 4/1978 | Beck et al. | 109/24.1 |
| 4,245,902 | 1/1981 | Cataldo et al. | 354/76 |

*Primary Examiner*—Harold I. Pitts

*Attorney, Agent, or Firm*—Cushman, Darby & Cushman

[57] ABSTRACT

An apparatus for recording identifying data relating to the use of a credit card, cheque or the like and for dispensing a receipt disclosing at least part of such data; the apparatus comprises a housing in which a camera is mounted for taking, through a one-way mirror, a picture of the user situated in photographic view of the housing. A height scale and other identifying data are displayed on the inner side of the mirror and are non-visible to the user but in photographic view of the camera. Activation of the apparatus is accomplished when the user inserts the credit card, cheque or the like into an appropriate slot provided in the housing and, if required, the indicated amount in a coin slot. A weight scale may also be provided to identify the weight of the user.

28 Claims, 7 Drawing Figures

APPARATUS FOR RECORDING IDENTIFYING DATA CONCERNING THE USE OF A CREDIT CARD, CHEQUE OR THE LIKE

This application is a continuous-in-part application of Ser. No. 328,709 filed Dec. 8, 1981, now abandoned.

FIELD OF THE INVENTION

The present invention pertains to an apparatus for recording identifying data relating to the use of a credit card, cheque or like document whenever identification of the user of such credit card, cheque or like document is needed.

BACKGROUND OF THE INVENTION

Various types of recording machines are known in the prior art. However, most of these machines are concerned with bank depository mechanisms at unmanned stations which identify visually the depositor and which deliver a receipt to the depositor. Such mechanisms can be found described in U.S. Pat. No. 3,836,980 issued Sept. 17, 1974 to Grosswiller et al. and U.S. Pat. No. 4,245,902 issued Jan. 20, 1981 to Cataldo et al. Other depository constructions for receiving deposits at unattended banking stations where a customer identifying card is inserted to initiate a deposit procedure are also known, one of which may be found described in U.S. Pat. No. 4,085,687 issued Apr. 25, 1978 to Beck et al.

On the other hand, there is often need in banks, when cash is to be remitted on a request supported by a credit card, cheque or other document, to have some record of the customer using such credit card, cheque or like document. This is not only true for banks but also in other establishments, such as hotels, where the use of credit cards or cheques serve to settle bills or accounts.

OBJECTS AND STATEMENT OF THE INVENTION

It is an object of the present invention to reduce fraud in such transactions. This is achieved by providing an apparatus which will record identifying data relative to the user of a credit card, cheque or similar document and which will dispense a receipt disclosing at least part of such data.

The apparatus of the present invention comprises a housing, a one-way mirror and a camera mounted therein for taking a picture of the user, through the one-way mirror. The apparatus is also equipped with means to dispense a receipt to the user, which receipt will show some of the information recorded by the apparatus. Some of this information is displayed on the inner side of the mirror and is photographed by the camera means.

One feature of the present invention is that the information displayed on the inner side of the mirror is in photographic view of the camera so that, as the user is photographed, this information is also photographed and will appear on the photographic film.

The present invention therefore relates to an apparatus for recording identifying data relative to the use of a credit card, cheque or like document which comprises: a housing; a one-way mirror mounted to the housing and disposed in a face viewing relation to the user of the credit card, cheque or like document; camera means mounted in the housing in photographic view of the mirror; height indication means in photographic view of the camera to record indication relative to the height of the user when the camera is actuated; identifying data on the inner side of the mirror in photographic view of the camera to record information relative to the use of the apparatus when the camera is actuated; means for causing actuation of the camera means; and means for dispensing outside the housing a receipt giving information including at least part of the identifying data.

In another form of the invention, a weight scale is provided outside the housing but is associated with the identifying data displayed on the inner side of the mirror so that the photograph taken will also register the weight of the user.

In another form of the invention, the actuation means consist of a compartment which the credit card, cheque or like document is inserted. Means are provided to detect the presence of the credit card and to activate the photographic process.

Other objects, purposes and characteristic features of the present invention will be, in part, obvious from the accompanying drawings and, in part, pointed out as the description of the invention progresses. In describing the invention in detail, reference will be made to the accompanying drawings, in which like reference characters designate corresponding parts throughout the several views. It should be understood, however, that this detailed description, while indicating preferred embodiments of the invention, is given by way of illustration only since various changes and modifications within the spirit and scope of the invention will be apparent to those skilled in the art.

IN THE DRAWINGS

DESCRIPTION OF EMBODIMENT OF THE INVENTION

Figure 1:
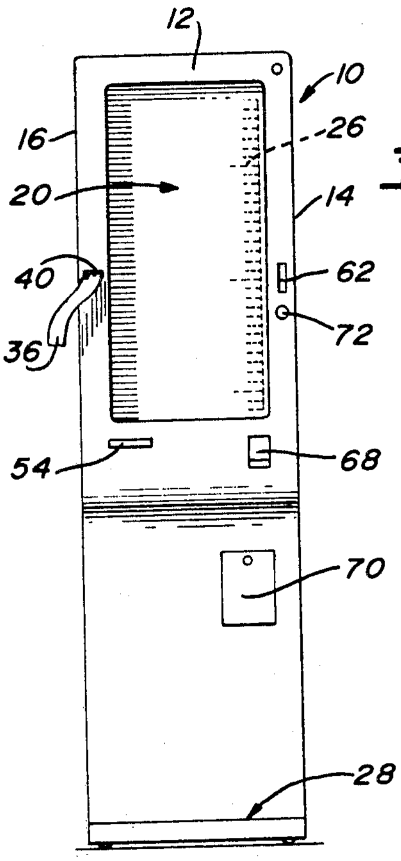
FIG. 1 is a front elevational view of one embodiment of the apparatus made in accordance with the present invention.
Figure 2:
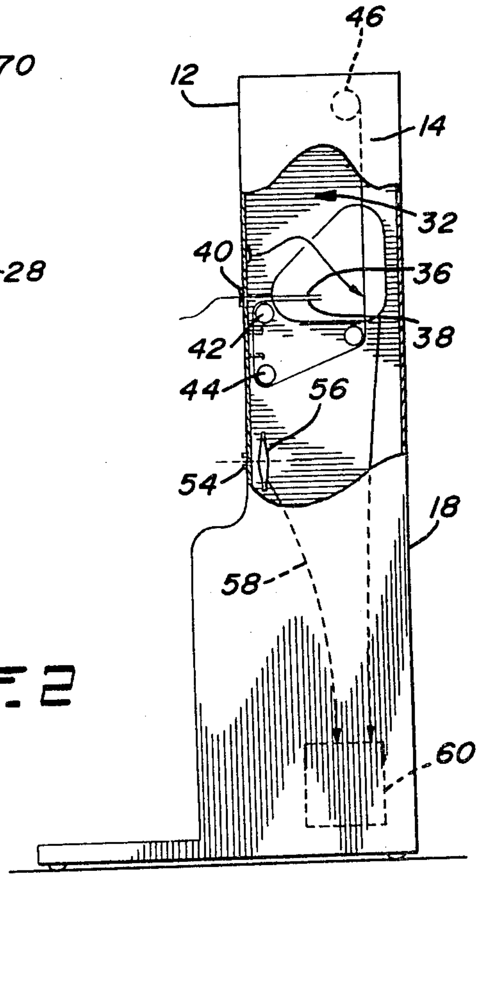
FIG. 2 is a side cross-sectional view of the apparatus showing the receipt dispensing means.

Referring to FIGS. 1 and 2, the embodiment illustrated comprises a housing 10 formed of a front wall 12, two opposite side walls 14 and 16 and a rear wall 18.

Figure 3:
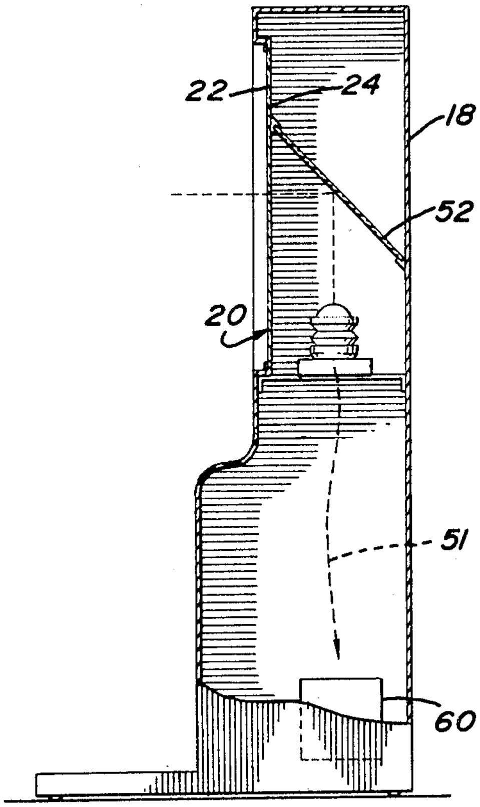
FIG. 3 is a side elevation cross-sectional view showing the camera.

The front wall 12 includes, in its upper part, a one-way mirror 20 with a reflective outer face 22 and a transparent inner face 24 (see FIG. 3). Preferably on the transparent inner face of the mirror, a height scale 26 extends vertically the entire height of the mirror.

Figure 4:
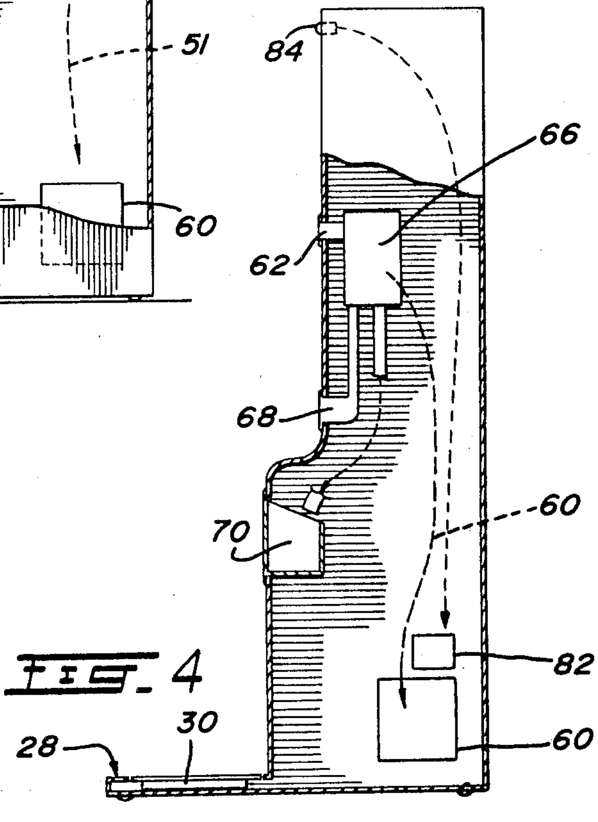
FIG. 4 is a side elevation cross-sectional view showing the coin collecting mechanism.

The base of the apparatus includes a weighing area 28 with a weighing scale 30 (see FIG. 4).

Referring to FIG. 2, the housing has an upper chamber 32 in which is lodged a receipt register, generally denoted 34, which is mounted near the sidewall 16 of the apparatus. This register dispenses duplicate copies 36 and 38 of a receipt on which the following information is provided: the weight of the user, the date of use of the apparatus, the registration number of the apparatus and a reference number pertaining to the actual use of the apparatus. One copy 32 of the receipt is issued to an exit slot 40 provided on the front wall 12 of the apparatus. A second copy 38 of the receipt is retained inside chamber 32 and passes over rollers 42 and 44 so as to be in the rear of the mirror. The receipt 38 then is recuperated on a bobbin 46.

Referring to FIG. 3, a camera 50 is mounted inside the internal chamber 32 and, through a mirror 52 inclined at 45°, is capable of taking a picture of an area corresponding to that of mirror 20.

The front wall 12 also displays a slot 54 in which may be inserted a credit card, a cheque or any similar document. Referring to FIG. 2, an optical detecting device 56 is provided to recognize the insertion of such document. Dotted lines 58 indicate that this optical detecting device 56 is electrically connected to a control circuit 60 disposed at the bottom of the housing. In FIG. 3, dotted lines 51 indicate the the camera is electrically connected to the control circuit 60.

Referring to FIG. 4, the front wall 12 of the housing further displays a coin receiving slot 62 which is electrically connected to the control circuit 60 as illustrated by dotted lines 64. A coin 65 is received in the coin collecting device 66 which may dispense it to a return shoot 68 or to a coin collecting box 70. A return button 72 is shown on the front panel 12 and is associated with the coin collecting mechanism described.

Referring to FIG. 4, the scale 28 is electrically connected to the control unit 60 as illustrated by dotted lines 80. A mechanism 82 serves for detecting any defects in the operation of the apparatus, in which case a lamp 84, located in the upper part of the front walls will be lit to indicate that the apparatus is operatively defective.

The operation of the apparatus will now be described. A customer who wishes to pay a bill or account by means of a credit card, cheque or other document, is first asked to mount on the scale 28 of the apparatus. He then inserts his credit card, cheque or document in slot 54 and, if required, deposits in slot 62 the required amount. The control unit 60 will set register 34 into operation only if lines 58 and 64 are energized, in which case, the weight of the user is transmitted to and recorded in register 34. The latter will print on both copies 36 and 38 of the slip the weight of the user, the date of use of the apparatus, a reference number concerning the actual use of the apparatus and the registration number of the apparatus. The issued copy 38 of the register slip passes in the photographic viewing area of the camera. The control unit 60 sets the camera 50 in operation whereby a picture of the upper body portion of the user is taken together with the slip portion 38. Hence, the photograph will also include the above identified information carried on the slip. The other copy 36 of the register slip exits at 40 for the customer's use for attaching with a cheque or other document. This copy does not include a photograph of the customer not identification as to his height.

If the customer removes the credit card or cheque prior to termination of the operation of the apparatus, the latter will stop; it will also stop if the customer comes off the scale since its operations are controlled by unit 60.

Figure 5:
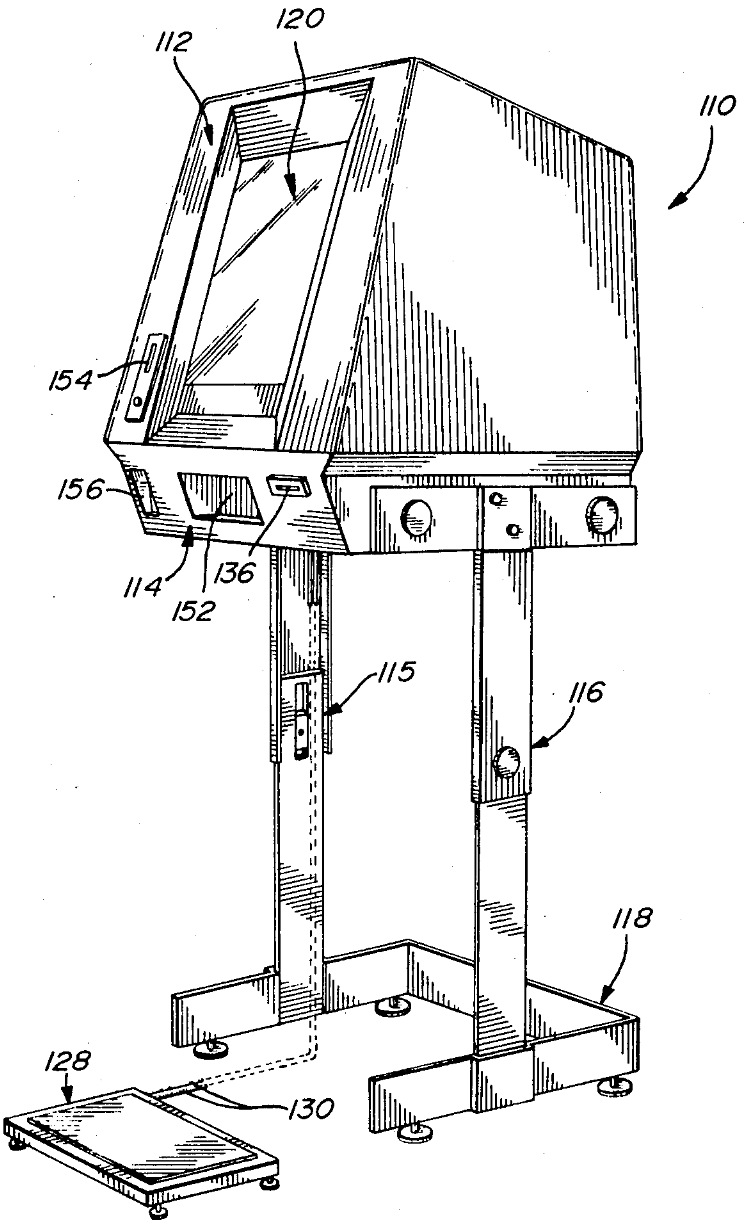
FIG. 5 is a perspective view of another embodiment of the present invention.
Figure 6:
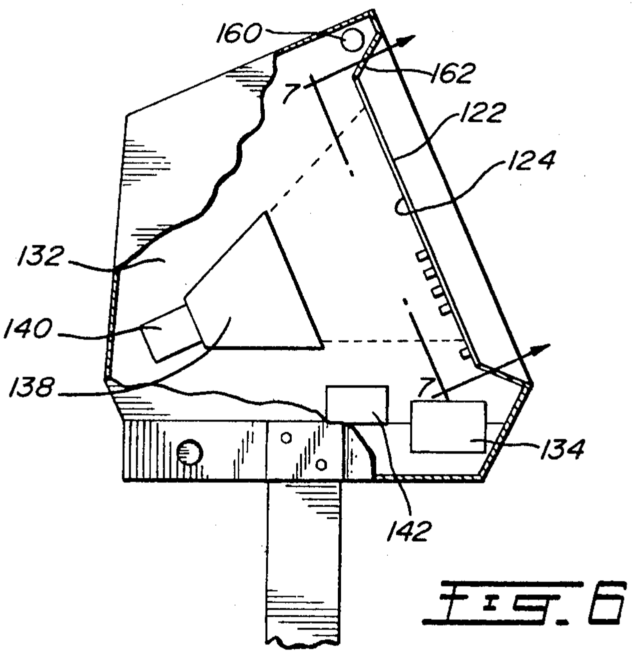
FIG. 6 is a side elevational view thereof.
Figure 7:
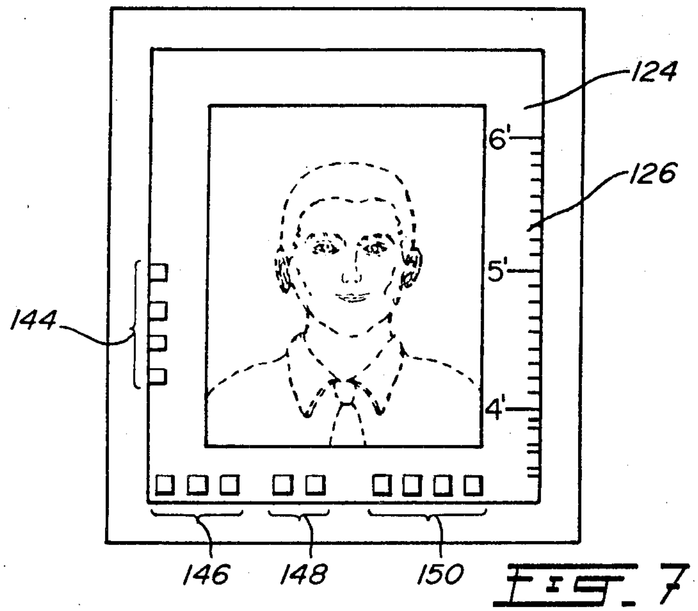
FIG. 7 is a view of the inner side of the mirror as seen from line 7—7 of FIG. 6.

Referring to FIGS. 5–7, a second embodiment of the present invention is illustrated and comprises a housing 110 displaying an inclined front wall having an upper portion 112 and a lower portion 114. The housing is supported on a pair of legs 115, 116 the lower ends of which are mounted to a base frame 118. The upper front wall portion 112 includes a one-way mirror 120 with a reflective outer face 122 and a transparent inner face 124. On the transparent inner face of the mirror, a height scale 126 is displayed along one side thereof.

Adjacent to the base 118, a weighing device 128 is provided and a connecting cable 130 transmits data pertaining to the weight of the user inside the housing 110 as further described below.

In FIG. 6, the housing is shown as including an inner chamber 132 which lodges a receipt register, generally denoted 134. This register dispenses a receipt at an outlet 136 on front wall portion 114. The receipt may include the following information in readable characters and/or coded form: the name of the owner of the establishment where the anti-fraud apparatus is located; the time and date of use of the apparatus; a number which corresponds to the location of a photograph on a camera film; and the apparatus number.

Contrary to the embodiment illustrated in FIGS. 1–4, a duplicate copy of the receipt is not dispensed by register 134.

In FIG. 6, a camera is schematically represented at 138. Block 140 represents an enclosure where the film may be kept until it is necessary to develop the film in order to retrieve information relating to a particular use of the machine.

Block 142 represents schematically the electronic circuitry which is required to display on the inner side of the one-way mirror at 144, 146, 148, 150 information pertaining to the use and user of the machine, which information is photographed with the user's upper body. This electronic circuitry displays the information in the form of digits. For example, digits 144 may represent a number associated with the particular machine while digits 146 may give the weight of the user. Digits 148 may represent the location of the photograph taken on the camera film while digits 150 may be a number representative of the user of the machine. Hence, when a photograph is taken of the user, all the digitized information appearing on the window frame, including the height scale 126, is recorded. Such electronic circuitry is relatively simple to devise and a detailed description thereof is not deemed necessary. Referring to FIG. 5, the front wall of housing 110 includes an appropriate slot 152 (similar to that of 54 in the FIG. 1) in which the user must insert his cheque, credit card or like document to set the machine in operation, in a manner similar to that described in connection with FIG. 1, wherein an optical detecting device initiates activation of the various operation of the machine. The front wall of the housing also includes a coin deposit slot 154 and a coin return slot 156 similar to that shown in FIG. 1.

Although the invention has been described with respect to two forms, it will be obvious to the man skilled in the art that it may be refined and modified in various ways. For example, a control circuit may be arranged so that it is not necessary to deposit a coin to set the apparatus in operation in cases where this service is free to the customer. Furthermore, a light 160 may be disposed in chamber 132 to illuminate the subject through a transparent glass 162. Also, a controlling circuit may be included to readily identify which part of the apparatus is defective. It is therefore wished to have it understood that the present invention is not limited in interpretation except by the terms of the following claims.

I claim:

1. An apparatus for recording identifying data relative to the use of a credit card, cheque or like document, comprising:
- a housing;
- a one-way mirror mounted to said housing and disposed in a face viewing relative to the user of said credit card, cheque, or like document;
- camera means mounted in said housing in photographic view of said mirror;
- height indication means in photographic view of said camera means to record indication relative to the height of the user when said camera means are actuated;
- identifying data on the inner side of said mirror in photographic view of said camera means to record information relative to the use of said apparatus when said camera means are actuated;
- means for causing actuation of said camera means; and
- means for dispensing outside said housing a receipt giving information including at least part of said identifying data.

2. An apparatus as defined in claim 1 wherein said height indication means consist of a scale disposed on the inner side of said one-way mirror.

3. An apparatus as defined in claim 1 or 2 wherein said identifying data on the inner side of said mirror include a number representative of said apparatus, a number indicating representative of a film in said camera means and a number representative of the user.

4. An apparatus as defined in claim 1, further comprising a scale means outside said housing for weighing the user; said identifying data on the inner side of said mirror including a number representative of the weight of the user.

5. An apparatus as defined in claim 1 or 4, wherein said receipt displays information relative to an establishment where said apparatus is used, information relative to the time of the use of said credit card, cheque or like document, information relative to a photograph on a film in said camera means, and information representative of the apparatus used.

6. An apparatus as defined in claim 1, wherein said actuation means include a compartment in said housing for depositing said credit card, cheque or the like, and means for detecting the presence of said credit card, cheque or the like in said compartment.

7. An apparatus as defined in claim 6, wherein said actuation means further comprise a coin receiving means in said housing and means for indicating the presence of a coin therein.

8. An apparatus for recording identifying data relative to the use of a credit card, cheque, or like document comprising:
- a housing;
- scale means outside said housing for weighing a user of said credit card, cheque or like document;
- means in said housing for recording the weight of the user;
- camera means in said housing for photographing at least the facial portion of the user;
- a height scale in photographic view of said camera means to provide indication relative to the height of the user whereby said height indication is photographed; and
- means in said housing for dispensing outside said housing a receipt giving information relative to the use of said apparatus.

9. An apparatus for recording identifying data concerning the user of a credit card, cheque or the like comprising:
- a housing having an internal chamber and a one-way mirror adjacent said chamber, said glass having a height scale displayed on one face thereof;
- weighing means located at the lower part of said housing for receiving the user thereon;
- means in said housing for recording the weight of said user;
- receipt dispensing means in said housing to provide data relative to the use of said apparatus;
- a camera in said internal chamber for photographing at least the facial portion of the user;
- a height scale in photographic view of said camera to provide height indication of the user whereby said height indication may be photographed; and
- means for passing said receipt in the photographic view of said camera whereby said receipt is photographed.

10. An apparatus as defined in claim 8 or claim 9 wherein said data relative to the use of said apparatus includes the time of use of the apparatus, a number associated with said apparatus and a photograph reference number.

11. An apparatus as defined in claim 9 wherein said dispensing means provide duplicate copies of said receipt; one of said copies being directed to said means passing the receipt in the photographic view of the camera, the other of said copies being dispensed outside said housing.

12. An apparatus as defined in claim 4 further comprising means in said housing for recuperating said one of said duplicate copies of said receipt.

13. An apparatus as defined in claim 8 or claim 9 comprising control circuit means for setting said camera in photographing operation.

14. An apparatus as defined in claim 13 wherein said housing includes means for detecting insertion of a credit card, cheque or like document in a compartment in said housing to activate said control circuit means.

15. An apparatus as defined in claim 13 wherein said housing includes means for detecting insertion of a coin to activate said control circuit means.

16. An apparatus as defined in claim 8 or 9 wherein said height scale is on the inner face of said mirror and is thereby non-visible to the user.

17. An apparatus as defined in claim 1, 8 or 9 wherein part of the information on said receipt is coded.

18. An apparatus for recording identifying data relative to the user of a credit card, cheque, or the like, comprising:
- a housing;
- a scale means outside said housing for weighing the user;
- means in said housing for recording the weight of the user;
- means in said housing for dispensing outside said housing a receipt giving information relative to the recorded weight of the user and data relative to the use of said apparatus;
- camera means in said housing for photographing the user; and
- a height sale in photographic view of said camera means to provide indication relative to the height of the user whereby said height indication is photographed.

19. An apparatus for recording identifying data concerning the user of a credit cart, cheque or the like comprising:

a housing having an internal chamber and a one-way mirror adjacent said chamber, said glass having a height scale displayed on one face thereof;

weighing means located at the lower part of said housing for receiving the user thereon;

means in said housing for recording the weight of said user;

receipt dispensing means in said housing to provide information including the weight of the user and data relative to the use of said apparatus;

a camera in said internal chamber for photographing the user;

a height scale in photographic view of said camera to provide indication height of the user whereby said height indication is photographed; and means for passing said receipt in the photographic view of said camera whereby said receipt is photographed.

20. An apparatus as defined in claim 18 or 19 when said data relative to the use of said apparatus includes the data of use of the apparatus, a number associated with said apparatus and a user reference number.

21. An apparatus as defined in claim 18 or 19 when said dispensing means provide duplicate copies of said receipt; one of said copies being directed to said means passing the receipt in the photographic view of the camera, the other of said copies being dispensed outside said housing.

22. An apparatus as defined in claim 21 further comprising means in said housing for recuperating said one of said duplicate copies of said receipt.

23. An apparatus as defined in claim 18 or 19 comprising control circuit means for setting said camera in photographing operation.

24. An apparatus as defined in claim 23 wherein said housing includes means for detecting insertion of a credit card, cheque or the like in said housing to activate said control circuit means.

25. An apparatus as defined in claim 23 wherein said housing includes means for detecting insertion of a coin to activate said control circuit means.

26. An apparatus as defined in claim 23 wherein said circuit control means are responsive to the combination of coin collecting means and of means detecting the presence of a credit card, cheque or the like in housing.

27. An apparatus as defined in claim 18 or 19 comprising means for indicating when said apparatus is defective.

28. An apparatus as defined in claim 18 wherein said height scale is on the inner face of said mirror and is thereby non-visible to the user.

* * * * *